No. 884,073. PATENTED APR. 7, 1908.
T. CHRUL.
HEATER FOR CONFECTIONERS' USE.
APPLICATION FILED SEPT. 14, 1907.
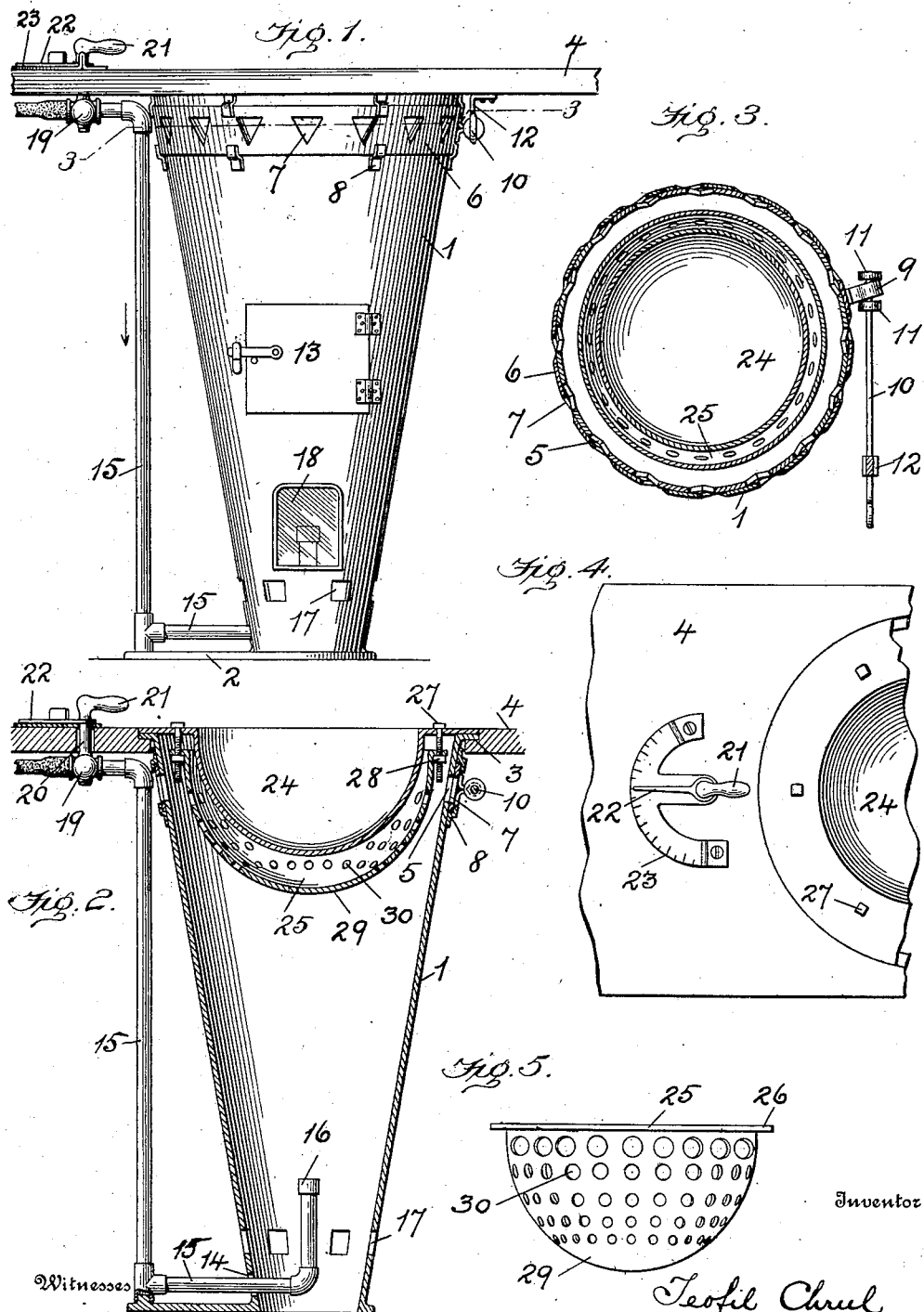

UNITED STATES PATENT OFFICE.

TEOFIL CHRUL, OF BALTIMORE, MARYLAND.

HEATER FOR CONFECTIONERS' USE.

No. 884,073. Specification of Letters Patent. Patented April 7, 1908.

Application filed September 14, 1907. Serial No. 392,845.

*To all whom it may concern:*

Be it known that I, TEOFIL CHRUL, a subject of the Czar of Russia, residing at Baltimore, in the State of Maryland, have invented certain new and useful Improvements in Heaters for Confectioners' Use, of which the following is a specification.

This invention relates to a heater especially designed for the use of confectioners in the manufacture of chocolates and similar confections.

The object of the invention is to provide a heater for the use of individual operators by means of which chocolate or similar substances used by confectioners may be melted and then maintained in a melted condition while being utilized as coatings or in other ways.

By providing a heater for the use of each individual operator the temperature may be regulated to suit the speed of each operator,—thus the speed of one operator being often much greater than that of another operator the heat condidions should be varied accordingly. The quantity of material to be maintained in a melted condition also makes it desirable that the heat conditions should be variable.

In many instances at the present time a series of heaters are provided and all of them are connected by piping, and steam or heated liquid is caused to circulate through all the heaters to maintain the material in a melted condition. This system is deemed objectionable because the temperature cannot be varied at each heater and my improved construction of heater is designed to overcome such objections.

The invention is illustrated in the accompanying drawing, in which,—

Figure 1 illustrates a side elevation of my improved heater. Fig. 2, shows a vertical sectional view of the same. Fig. 3, illustrates a sectional plan view,—the section being taken on the line 3—3 of Fig. 1. Fig. 4 shows a plan view of a portion of the table,—the heater, and the valve device for regulating the heating medium, and Fig. 5 illustrates a side elevation of the perforated baffle bowl.

Referring to the drawing by numerals, 1, designates a shell or casing of an inverted conical form which rests upon a base plate, 2, and which extends vertically from said base plate and has it upper flanged end, 3, fitted in an opening in a table, 4. Near its upper end this shell or casing is provided with a series of V-shaped openings, 5, which are located circumferentially around the shell in a horizontal plane.

A band, 6, encircles the shell adjacent said openings and said band is also provided with a plurality of V-shaped openings 7, around its circumference. This band is sustained about the shell, in the present instance, by suitable brackets, 8, so that it may be rotated close against the shell wall to bring its openings, 7, in register, or partly in register with the openings, 5, of the shell.

In order to conveniently effect this partial rotation of the band with respect to the shell the band is provided with a bracket, 9, and an operating rod, 10, extends through said bracket and is provided with lugs, 11, at each side thereof. The outer end of the rod is sustained in a suitable bracket, 12, that depends from the bottom of the table, 4. It will be seen that by reciprocating the rod the band may be rotated around the shell to bring the openings, 5, and, 7, more or less into register.

To permit convenient access to the interior of the shell a door, 13, is provided at one side thereof. At the lower end the shell or casing is provided with an opening, 14, through which a pipe, 15, extends and the inner end of this pipe is provided with a burner, 16, of any desired construction which has position in the lower end of the casing. Air inlet holes, 17, are also provided in the lower end of the casing adjacent the burner and a window, 18, in the casing wall enables the burner to be seen for the purpose of regulating the flame. The pipe, 15, extends vertically from the base of the heater and at its upper end is provided with a valve, 19, which has a stem, 20, that projects up through an opening in the table with a hand grasp, 21, above the table surface. An indicator finger, 22, is carried by and turns with the valve stem, 20, and an indicator plate, 23, is mounted on the table to show to what extent the valve is open for the passage of gas.

A bowl or receptacle, 24, is provided with an annular flange, 25, and said bowl fits down into the upper and larger flanged end, 3, of the shell or casing with its flange preferably flush with the table top. The material to be melted is placed in this bowl, 24, but to better control and regulate the heat that is applied to the bottom of the bowl I provide a supplemental bowl, 25, into which the melting bowl projects. This supplemental bowl, 25, is sustained in a pendent position beneath the melting bowl and in the present instance it has a flange, 26, at its upper edge. Bolts, 27, extend down through the flange of the melting bowl and said bolts project through the flange of the supplemental bowl and screw into nuts, 28 on the under side of said flange, 26.

It is obvious that lugs may be provided on the side of the supplemental bowl in place of the flange. By means of the bolts, 27, and nuts, 28, the position of the supplemental bowl may be varied in a vertical direction in order to increase or lessen the size of the space between the two bowls. The lowermost portion, 29, of the supplemental bowl is imperforate while the wall thereof above the imperforate portion is provided with a series of perforations, 30, of gradually increasing size.

The operation of the device is simple and as follows: The hand grasp, 21, of the valve, 19, is turned to permit the flow of gas to the burner, 16, which latter is accessible through the door, 13. When the casing, supplemental bowl and melting bowl are sufficiently heated to effect the melting of the material, the latter is placed in the melting bowl and allowed to melt. After being melted very little heat is required to maintain the material in the melted condition and the operator may then adjust the valve to cut down the flow of gas. The amount of gas required for this purpose may be reduced to a minimum and to suit the particular operator, as some operators can, by speed, handle considerable more material than other operators and consequently more material will be originally melted in the bowl. By being able to adjust the supplemental bowl with respect to the stationary melting bowl the heat conditions may also be varied independently of the valve, and between the two adjustments the device may be regulated to a nicety. Another desirable adjustment to enable the device to fulfil the requirements of various materials to be worked is the capability of varying the openings, 5, in the outer shell by means of the band 6, and its openings, 7. By rotating this band the outlet for the products of combustion may be regulated according to the quality of the gas employed and the temperatures and drafts in the operating room where the heaters are in use.

Having thus described my invention what I claim is:—

1. A heater comprising an outer shell having an open upper end; a gas burner in the shell; a bowl receptacle at said open end of the shell and projecting down into the latter; a perforated supplemental bowl beneath the bowl receptacle, and means for vertically adjusting the position of the supplemental bowl with respect to the bowl receptacle.

2. A heater comprising an outer shell having an open upper end and a plurality of vent openings in its side wall; a gas burner in the shell; a flanged bowl receptacle supported at the upper end of the shell and projecting downwardly therein; a perforated band extending around the wall of the shell and coacting with the vent openings in the latter, and means for rotating said band with respect to said shell.

3. A heater comprising an outer shell having an open upper end with a plurality of vent openings in the side walls adjacent said upper end; a gas burner in said shell; a flanged bowl receptacle at the upper end of the shell and projecting downwardly therein; a perforated supplemental bowl adjustably sustained in the shell from said bowl receptacle; a perforated band extending around the wall of the shell over the vent openings therein and means for rotating said band with respect to the shell.

4. A heater comprising an inverted conical shell having vent openings in the wall adjacent the larger upper end; a burner in said shell; a flanged bowl receptacle sustained at the upper end of the shell and projecting downwardly therein; a perforated supplemental bowl adjustably sustained from the flange of the bowl receptacle, and a movable ring band extending around the upper larger end of the shell wall and having a plurality of perforations to register with the vent openings in the shell.

5. A heater for confectioners' use comprising a table having an opening therein, a shell provided with vent openings in its wall adjacent to its upper end and below the table; a bowl receptacle sustained in the upper end of the shell; a ring band extending around the shell adjacent the vent openings; means for operating said band to open and close the vent openings; a gas burner in the shell, and means on the table for regulating the gas.

In testimony whereof I affix my signature in presence of two witnesses.

TEOFIL CHRUL.

Witnesses:
CHAS. B. MANN,
JOHN W. HEWES.